Patented June 23, 1925.

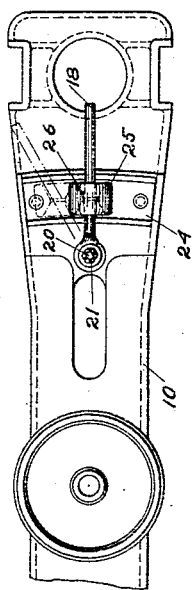
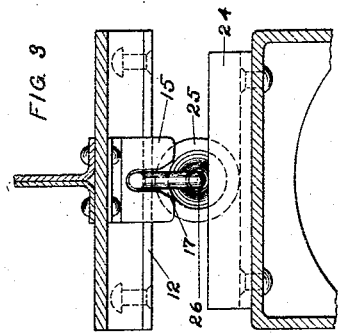
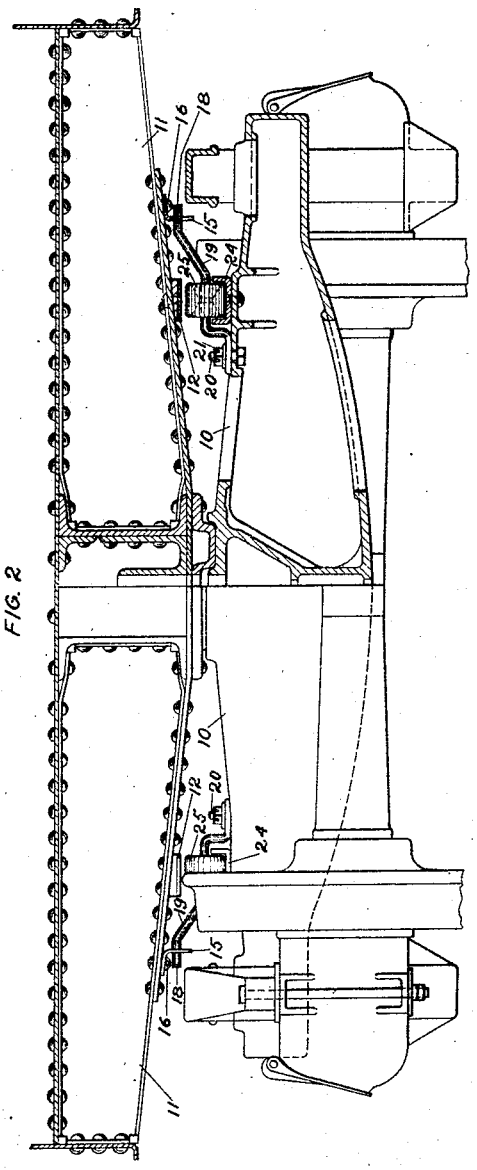

1,543,329

UNITED STATES PATENT OFFICE.

ERNEST G. GOODWIN, OF NEW YORK, N. Y., ASSIGNOR, BY MESNE ASSIGNMENTS, TO GOODWIN SIDE BEARING CO., INC., OF WILMINGTON, DELAWARE, A CORPORATION OF DELAWARE.

SIDE BEARING.

Application filed September 20, 1922. Serial No. 589,376.

*To all whom it may concern:*

Be it known that I, ERNEST G. GOODWIN, a citizen of the United States, residing at New York, in the county of New York and State of New York, have invented certain new and useful Improvements in Side Bearings; and I do hereby declare the following to be a full, clear, and exact description of the same, reference being had to the accompanying drawings, forming part of this specification.

This invention relates to side bearings for railway cars, and has for its object the provision of an improved bearing that will be simple in construction and yet more efficient than the bearings now in use.

Railway cars are commonly provided with side bearings which are usually gravity or spring-centered, so that in normal operation, since the car does not ordinarily rest on the side bearing, the bearings remain in their mid-position when the car goes on a curve, unless the bearings are loaded and even in this case they return to mid-position immediately upon removal of the load. As the result of this, when a car, turning a curve in one direction, settles on one of the side bearings and then turns a curve in the opposite direction while still settled on the first bearing requires the total travel of the bearing while but one-half of such travel is available.

In the present invention, the roller is positioned by a rod of such length as to position the roller at all times in exactly the same place as if it were constantly loaded, and consequently the entire travel of the device is available at all times. The positioning rod does not in any way hinder the travel of the roller when engaged by the upper bearing, since both the load and the positioning rod each tend to move the roller in the same direction and at the same rate.

In the drawings,—

Figure 1 is a plan view of the device with the body bolster and its pivot plate removed.

Fig. 2 is a vertical section through the device.

Fig. 3 is an end view.

The truck bolster 10 and body bolster 11 are of the usual type, the latter carrying an upward bearing plate 12 either arcuate or rectangular, and preferably having a plane lower surface, although the upper bearing plate may be channeled, if desired. The guide or pivot plate 15 is shown in Fig. 2 as being secured to the body bolster, and as a very simple form, consisting merely of a small angle bolted to the bolster, as at 16, and having a tapered slot 17 to receive the free outer end 18 of the positioning device 19, here shown as a rod pivoted to the truck bolster by means of a bolt 20 having a castle nut 21.

The lower guideway 24 is preferably a segment shaped piece of channel cross section, the legs of the channel being directed upwardly and being spaced apart so as to form a fairly snug fit with the cylindrical roller 25, so as to guide it in its travel from side to side.

The roller 25 has a central bore to fit snugly the positioning rod 19 at the constricted central portion 26 of the bore which, as best seen in Fig. 2 is formed by two coaxial cones preferably of the same size in order that the roller 25 may be reversed. The vertex angle of each cone is determined by the extreme travel of the roller and is such that when the roller is at either extreme of travel, the rod is in contact with the side of one or both cones.

In order that the roller shall move when not loaded exactly as if the bearing was in use, the distance between the axis of the pivot 20 and the axis of the pivot in the member 15 should be calculated with that end in view. For example, where the bearing is placed with its center line twenty seven inches from the center line of the car, the distance between the center of the roller and the pivot 20 should be five and three eighths inches, if the distance between the guide plate 15 and the center of the roller is nine inches. The particular shape of the roller is necessary, as stated, to take care of the angularity of the positioning rod, but at the same time, it does not materially weaken the roller.

The rod acts as a retainer for the roller and makes the use of trunnions unnecessary. All friction is avoided for the reason that the load always comes on the periphery of the roller, at both the top and the bottom, and hence the friction always present where rollers are supported on trunnions and where they come in contact with the end walls of the runway, is entirely avoided.

I prefer to make all of the various parts of the side bearings of forged material. This bearing has been found less expensive to manufacture than other bearings and cannot possibly surge back and forth with changes in the velocity of the car. It will readily be seen from the drawings that the body bolster may be removed from the truck bolster without interference of any kind from the positioning rod, and that when the body bolster is so removed there will be no danger of losing the roller by virtue of the channel formation of the lower bearing. At the same time, if it is desired to remove the roller this can readily be done by unbolting or loosening the positioning rod. It is intended that the roller shall bind between the channel flanges and against the rod at the diagonal corners of the roller before it passes to the end of the channel in order to avoid the possibility of the rollers falling from the truck and becoming lost when handling a truck while separated from the car. The fulcrum of the rod may be in any one of four locations, i. e., either end of the rod may be anchored (pivoted) and to either the body bolster or to the truck boltser and the other end pivoted (slidably connected) to the other member by the slot connection.

I claim:

1. In a roller side bearing for railway cars, the combination of upper and lower bearing plates, a cylindrical roller between said plates, a roller positioning device, said device being pivoted at one end on the truck bolster and extending through the roller and across the lower bearing plate and said plate being wholly under said device, and a guide on the car bolster in which the other end of said device is loosely received.

2. A roller side bearing for railway cars, of the type employing upper and lower bearing plates, a roller between said plates, and a roller positioning device, characterized by the roller having a central opening for the positioning device, said opening being constricted at the center of the roller and increasing in size toward each side face, said positioning device extending across the lower bearing plate and said plate being wholly under said device.

3. A roller side bearing for railway cars, of the type employing a plurality of bearing plates, a cylindrical roller between said plates, and a roller positioning device, characterized by the provision of a rod and a roller having a central opening through which the positioning rod extends, said opening being constricted at the center of the roller to a diameter substantially equal to that of the rod and being formed by two coaxial cones on opposite sides of the constricted central opening.

4. A roller side bearing for railway cars, of the type employing a plurality of bearing plates, a roller between said plates, and a roller positioning device, characterized by the roller having a central opening for the positioning device, said opening being constricted at the center of the roller and being formed by two coaxial cones, one of said bearings being formed by an open ended channel, said roller having a central bore formed by two opposed cones, and said positioning device being a rod snugly fitting the restricted portion of said bore and being pivoted to the body bolster to one side of the bearing plates and to the truck bolster to the other side of said bearing plates.

ERNEST G. GOODWIN.